United States Patent
Wang et al.

(10) Patent No.: US 12,296,722 B2
(45) Date of Patent: May 13, 2025

(54) MAIN CIRCUIT OF TRACTION SYSTEM AND CONTROL METHOD THEREFOR AND RAIL VEHICLE

(71) Applicant: ZHUZHOU CRRC TIMES ELECTRIC CO., LTD., Hunan (CN)

(72) Inventors: Long Wang, Hunan (CN); Xinjian Chen, Hunan (CN); Bin Zhang, Hunan (CN); Wenguang Chen, Hunan (CN); Chaolu Chen, Hunan (CN); Rong Mou, Hunan (CN); Anhui Ji, Hunan (CN); Xiong Liu, Hunan (CN); Nannan Xu, Hunan (CN); Jun Yang, Hunan (CN); Zhengliang Gao, Hunan (CN); Haobin Xiong, Hunan (CN); Mingliang Zeng, Hunan (CN); Dongpo Zhu, Hunan (CN)

(73) Assignee: ZHUZHOU CRRC TIMES ELECTRIC CO., LTD., Hunan (CN)

( * ) Notice: Subject to any disclaimer, the term of this patent is extended or adjusted under 35 U.S.C. 154(b) by 936 days.

(21) Appl. No.: 17/254,310

(22) PCT Filed: Nov. 22, 2018

(86) PCT No.: PCT/CN2018/116883
§ 371 (c)(1),
(2) Date: Dec. 21, 2020

(87) PCT Pub. No.: WO2019/242226
PCT Pub. Date: Dec. 26, 2019

(65) Prior Publication Data
US 2021/0114466 A1   Apr. 22, 2021

(30) Foreign Application Priority Data
Jun. 21, 2018   (CN) .......................... 201810644334.0

(51) Int. Cl.
*B60L 9/18* (2006.01)
*B60L 7/16* (2006.01)
(Continued)

(52) U.S. Cl.
CPC ........ *B60L 9/18* (2013.01); *B60L 7/16* (2013.01); *B60M 1/30* (2013.01); *B61H 9/04* (2013.01); *B61L 25/065* (2013.01)

(58) Field of Classification Search
None
See application file for complete search history.

(56) References Cited

U.S. PATENT DOCUMENTS 4,326,154 A * 4/1982 Lewis ................. B60L 7/22
318/370
5,331,261 A 7/1994 Brown et al.
(Continued)

FOREIGN PATENT DOCUMENTS

CN   101040432 A   9/2007
CN   101353020 A   1/2009
(Continued)

OTHER PUBLICATIONS

International Search Report for PCT/CN2018/116883 mailed Mar. 20, 2019, ISA/CN.
(Continued)

*Primary Examiner* — Behrang Badii
*Assistant Examiner* — Paysun Wu
(74) *Attorney, Agent, or Firm* — Yue (Robert) Xu; Apex Attorneys at Law, LLP

(57) ABSTRACT

A method for controlling a main circuit of a traction system is provided. The method includes: under a braking condition, controlling a protection module to be turned off; controlling the protection module to be turned on and monitoring a first current detected by a first current sensor in
(Continued)

a case that a rail vehicle runs on a charged third rail; and controlling the protection module to be turned off and monitoring whether the rail vehicle runs on a charged third rail in a case that the first current is less than a first preset current.

10 Claims, 3 Drawing Sheets

(51) Int. Cl.
*B60M 1/30* (2006.01)
*B61H 9/04* (2006.01)
*B61L 25/06* (2006.01)

(56) References Cited

U.S. PATENT DOCUMENTS

| | | |
|---|---|---|
| 2008/0004760 A1 | 1/2008 | Sogihara |
| 2009/0224706 A1 | 9/2009 | Jobard |
| 2011/0307113 A1 | 12/2011 | Kumar et al. |
| 2013/0241428 A1* | 9/2013 | Takeda .................. H05B 45/37 315/210 |
| 2017/0297861 A1* | 10/2017 | Nakari .................. H02M 7/217 |
| 2018/0254732 A1* | 9/2018 | Smolenaers .............. H02J 1/12 |
| 2020/0136375 A1* | 4/2020 | Schierling .............. H02H 3/087 |

FOREIGN PATENT DOCUMENTS

| | | |
|---|---|---|
| CN | 101380900 A | 3/2009 |
| CN | 203012033 U | 6/2013 |
| CN | 106347143 A | 1/2017 |
| CN | 106394318 A | 2/2017 |
| CN | 107310398 A | 11/2017 |
| CN | 108001239 A | 5/2018 |
| JP | 2002095299 A | 3/2002 |
| JP | 2017055500 A | 3/2017 |

OTHER PUBLICATIONS

First Office Action dated Aug. 3, 2022 for Chinese patent application No. 201810644334.0, English translation provided by Global Dossier.

* cited by examiner

MAIN CIRCUIT OF TRACTION SYSTEM AND CONTROL METHOD THEREFOR AND RAIL VEHICLE

This application is the national phase of International Application No. PCT/CN2018/116883, titled "MAIN CIRCUIT OF TRACTION SYSTEM AND CONTROL METHOD THEREFOR AND RAIL VEHICLE", filed on Nov. 22, 2018, which claims the priority to Chinese Patent Application No. 201810644334.0, titled "MAIN CIRCUIT OF TRACTION SYSTEM AND CONTROL METHOD THEREFOR AND RAIL VEHICLE", filed on Jun. 21, 2018 with the China National Intellectual Property Administration, which are incorporated herein by reference in their entireties.

FIELD

The present disclosure relates to the technical field of rail vehicles, and in particular to a method for controlling a main circuit of a traction system, a main circuit of a traction system and a rail vehicle.

BACKGROUND

Currently, a considerable number of rail vehicles are powered by electrical energy collected by a third rail. Since a third rail has different power supply divisions and a rail has branches, the third rail cannot be continuous and has an electricity gap (rail gap). Further, there are many uncharged third rails (dead rails) due to faults or construction by workers.

Reference is made to FIG. 2, which is a schematic structural diagram of a main circuit of a traction system in the conventional technology. The main circuit of a traction system includes a current collector A, a first current sensor LH1, a voltage sensor VH, a protection module, a support capacitor C, a current conversion module and a processor. The protection module includes a charging contactor KM1, a charging resistor R and a short-circuit contactor KM2. A first end of the charging contactor KM1 is connected to a first end of the short-circuit contactor KM2, as a first end of the protection module. A second end of the charging contactor KM1 is connected to a first end of the charging resistor R. A second end of the charging resistor R is connected to a second end of the short-circuit contactor KM2, as a second end of the protection module.

In the conventional technology, the processor controls the protection module to be turned off during a braking condition of a rail vehicle in order to prevent electrical energy generated by a traction motor from being fed back to a dead rail via the current collector. In this case, even if the third rail is capable of collecting electrical energy, electrical energy generated by the traction motor cannot be fed back to the third rail and has to be consumed by a braking resistor, resulting in waste of the electrical energy.

Therefore, how to solve the above technical problems is required to be solved by those skilled in the art currently.

SUMMARY

A method for controlling a main circuit of a traction system is provided according to the present disclosure, such that electrical energy generated by braking a traction motor can be safely fed back to a charged third rail, thereby saving the electrical energy. In addition, a main circuit of a traction system and a rail vehicle are further provided according to the present disclosure, such that electrical energy generated by braking a traction motor can be safely fed back to a charged third rail, thereby saving the electrical energy.

To solve the above technical problems, a method for controlling a main circuit of a traction system is provided according to the present disclosure. The method includes: under a braking condition, controlling a protection module to be turned off; controlling the protection module to be turned on and monitoring a first current detected by a first current sensor in a case that a rail vehicle runs on a charged third rail; and controlling the protection module to be turned off and monitoring whether the rail vehicle runs on a charged third rail in a case that the first current is less than a first preset value.

Preferably, the method further includes: under a traction condition or a coasting condition, controlling the protection module to be turned off; controlling the protection module to be turned on and monitoring a first current detected by the first current sensor in a case that the rail vehicle runs on a charged third rail; and controlling the protection module to be turned off and monitoring whether the rail vehicle runs on a charged third rail in a case that the first current is less than the first preset value.

Preferably, the rail vehicle running on a charged third rail includes a case that a voltage detected by a voltage sensor is greater than a second preset value, where the controlling the protection module to be turned off and monitoring whether the rail vehicle runs on a charged third rail in a case that the first current is less than a first preset value includes: controlling the protection module to be turned off and monitoring the voltage in the case that the first current is less than the first preset value.

To solve the above technical problems, a main circuit of a traction system is further provided according to the present disclosure. The main circuit of a traction system includes a current collector, a first current sensor, a voltage sensor, a protection module, a support capacitor, a current conversion module and a processor. The processor is configured to execute a computer program to perform the method for controlling a main circuit of a traction system according to any one of the above.

Preferably, the protection module includes a first controllable switch, a first unidirectional conductive component, a second controllable switch and a second unidirectional conductive component. A first end of the first controllable switch is connected to a first end of the first unidirectional conductive component, as a first end of the protection module. A second end of the first controllable switch and a second end of the first unidirectional conductive component are both connected to a first end of the second controllable switch and a first end of the second unidirectional conductive component. A second end of the second controllable switch is connected to a second end of the second unidirectional conductive component, as a second end of the protection module. A direction in which the first unidirectional conductive component outputs a current is opposite to a direction in which the second unidirectional conductive component outputs a current.

Preferably, the main circuit of a traction system further includes a circuit breaker. A first end of the circuit breaker is connected to a second end of the first current sensor. A second end of the circuit breaker is connected to the first end of the protection module and a first end of the voltage sensor. The circuit breaker is configured to control the main circuit of a traction system to be turned on or turned off.

Preferably, the main circuit of a traction system further includes an inductor. A first end of the inductor is connected to the second end of the protection module. A second end of the inductor is connected to a first end of the support capacitor and a first end of the current conversion module. The inductor is configured to perform filtering together with the support capacitor.

Preferably, the main circuit of a traction system further includes a second current sensor. A first end of the second current sensor is connected to a second end of the voltage sensor, a second end of the current conversion module and a second end of the support capacitor. A second end of the second current sensor is grounded. An output end of the second current sensor is connected to the processor. The processor is further configured to control the circuit breaker to be turned off in a case that a difference between a second current detected by the second current sensor and the first current is greater than a preset difference.

Preferably, at least one of the first controllable switch and the second controllable switch is implemented by an insulated gate bipolar transistor IGBT. In a case that the first controllable switch is implemented by the IGBT, a parasitic diode of the first controllable switch serves as the first unidirectional conductive component. In a case that the second controllable switch is implemented by the IGBT, a parasitic diode of the second controllable switch serves as the second unidirectional conductive component.

To solve the above technical problems, a rail vehicle is further provided according to the present disclosure. The rail vehicle includes the main circuit of a traction system according to any one of the above.

A method for controlling a main circuit of a traction system is provided according to the present disclosure. The method includes: under a braking condition, controlling a protection module to be turned off; controlling the protection module to be turned on and monitoring a first current detected by a first current sensor in a case that a rail vehicle runs on a charged third rail; and controlling the protection module to be turned off and monitoring whether the rail vehicle runs on a charged third rail in a case that the first current is less than a first preset value.

It can be seen that in the present disclosure, in a case that a rail vehicle operates under a braking condition, the protection module is controlled to be turned off first. In a case that the rail vehicle runs on a charged third rail, the protection module is controlled to be turned on, so that electrical energy generated by a traction motor can be safely fed back to the charged third rail via the current conversion module. In addition, a current detected by the first current sensor is monitored. A case that the current is less than a first preset value indicates that the third rail is uncharged or that the third rail is incapable of collecting electrical energy. In this case, the protection module is controlled to be turned off. Therefore, the electrical energy generated by the traction motor can be prevented from being fed back to the uncharged third rail so as to avoid accidents. Further, the electrical energy generated by braking the traction motor can be fed back to the charged third rail for utilization, thereby saving the electrical energy.

A main circuit of a traction system and a rail vehicle are further provided according to the present disclosure, and have the same beneficial effects as the above method.

BRIEF DESCRIPTION OF THE DRAWINGS

In order to illustrate technical solutions in embodiments of the present disclosure more clearly, drawings to be used in the description of the embodiments or the conventional technology are introduced simply hereinafter. It is apparent that the drawings described below show only some embodiments of the present disclosure. For those skilled in the art, other drawings may be obtained based on the provided drawings without any creative work.

DETAILED DESCRIPTION OF THE EMBODIMENTS

A method for controlling a main circuit of a traction system is provided according to the present disclosure, such that electrical energy generated by braking a traction motor can be safely fed back to a charged third rail, thereby saving the electrical energy. In addition, a main circuit of a traction system and a rail vehicle are further provided according to the present disclosure, such that electrical energy generated by braking a traction motor can be safely fed back to a charged third rail, thereby saving the electrical energy.

In order to make objects, technical solutions and advantages of the embodiments of the present disclosure clearer, the technical solutions in the embodiments of the present disclosure are described clearly and completely in conjunction with the drawings in the embodiments of the disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

Figure 1:
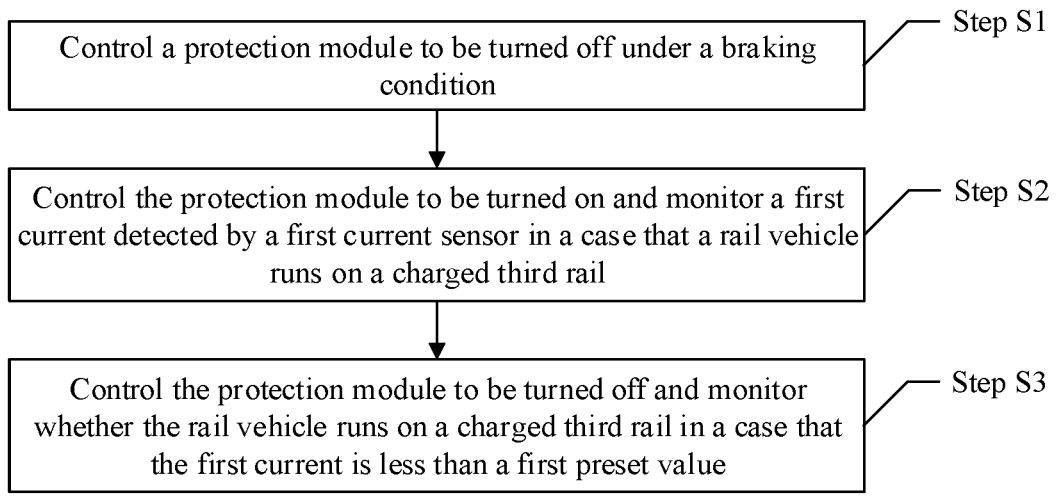
FIG. 1 is a schematic flowchart of a method for controlling a main circuit of a traction system according to the present disclosure.

Reference is made to FIG. 1, which is a schematic flowchart of a method for controlling a main circuit of a traction system according to the present disclosure. The method includes the following steps S1 to S3.

In step S1, under a braking condition, a protection module 3 is controlled to be turned off.

Under the braking condition, the protection module 3 is controlled to be turned off first, so as to prevent electrical energy generated by a traction motor under the braking condition from being fed back to a uncharged third rail via a current conversion module 2 and the protection module 3, thereby avoiding accidental damage to a worker on the uncharged third rail.

Figure 2:
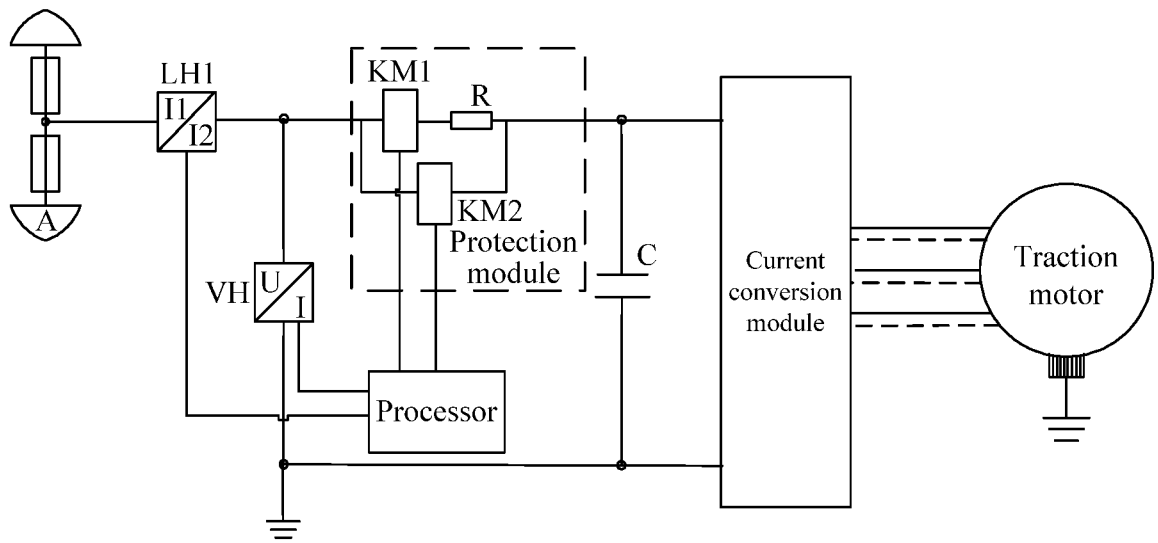
FIG. 2 is a schematic structural diagram of a main circuit of a traction system according to the conventional technology.

The protection module 3 is configured to control a circuit to be turned on or turned off. The protection module 3 may be in various forms and may be arranged at various positions in the circuit, for example, as shown in FIG. 2. Forms and positions of the protection module 3 are not limited in the embodiments of the present disclosure.

In step S2, in a case that a rail vehicle runs on a charged third rail, the protection module 3 is controlled to be turned on, and a first current detected by a first current sensor LH1 is monitored.

In the case that the rail vehicle runs on a charged third rail, the electrical energy generated by the traction motor can be safely fed back to the third rail. After the protection module 3 is controlled to be turned on, alternating current electricity generated by the traction motor is rectified by the current conversion module 2 and then is fed back to the charged third rail via the protection module 3. The third rail collects the alternating current electricity to supply other rail vehicles running on the third rail. Therefore, it is unnecessary to consume, by a braking resistor, the electrical energy generated by braking the traction motor, thereby improving utilization of electrical energy and saving the electrical energy.

The first current detected by the first current sensor LH1 is a current fed back to the third rail by the traction motor. This current is monitored to facilitate the following operations.

In step S3, in a case that the first current is less than a first preset value, the protection module 3 is controlled to be turned off, and it is monitored whether the rail vehicle runs on a charged third rail.

In an embodiment of the present disclosure, the case that the first current is less than the first preset value may indicate that the rail vehicle runs on an uncharged third rail, that is, a dead rail, or indicate that the third rail is incapable of collecting electrical energy. In this case, the protection module 3 is controlled to be turned off so as to prevent the electrical energy generated by the traction motor from being fed back to the dead rail, thereby avoiding accidental damage to a worker on the dead rail. In addition, it is further monitored whether the rail vehicle runs on a charged third rail, so as to control the protection module 3 to be turned on to feed the electrical energy back to a charged third rail when the rail vehicle runs on the charged third rail.

The first preset value may have a value approximating zero. In a case that the rail vehicle rans in a rail gap or runs on a dead rail, or a charged third rail is capable of collecting electrical energy, the first current first approximates zero first and then decreases to zero. When the first current approximates zero, the protection module 3 is controlled to be turned off, so as to further improve safety of the main circuit of a traction system, thereby preventing the electrical energy from being fed back to the dead rail.

In addition, in a case that the protection module 3 is turned off, the electrical energy generated by the traction motor may be consumed by the braking resistor. A braking unit may be integrated in the current conversion module 2. The braking unit may be a chopper circuit. The chopper circuit is connected to the braking resistor and is configured to control the braking resistor to consume the electrical energy generated by the traction motor.

A method for controlling a main circuit of a traction system is provided according to the present disclosure. The method includes: under a braking condition, controlling a protection module to be turned off; controlling the protection module to be turned on and monitoring a first current detected by a first current sensor in a case that a rail vehicle runs on a charged third rail; and controlling the protection module to be turned off and monitoring whether the rail vehicle runs on a charged third rail in a case that the first current is less than a first preset value.

It can be seen that in the present disclosure, in a case that a rail vehicle operates under a braking condition, the protection module is controlled to be turned off first. In a case that the rail vehicle runs on a charged third rail, the protection module is controlled to be turned on, so that electrical energy generated by a traction motor can be safely fed back to the charged third rail via the current conversion module. Further, a current detected by the first current sensor is monitored. A case that the current is less than a first preset value indicates that the third rail is uncharged or that the third rail is incapable of collecting electrical energy. In this case, the protection module is controlled to be turned off. Therefore, the electrical energy generated by the traction motor can be prevented from being fed back to the uncharged third rail so as to avoid accidents. Further, the electrical energy generated by braking the traction motor can be fed back to the charged third rail for utilization, thereby saving electrical energy.

Based on the above embodiments, in a preferred embodiment, the method further includes: under a traction condition or a coasting condition, controlling the protection module to be turned off; controlling the protection module to be turned on and monitoring a first current detected by the first current sensor in a case that the rail vehicle runs on a charged third rail; and controlling the protection module to be turned off and monitoring whether the rail vehicle runs on a charged third rail in a case that the first current is less than the first preset value.

In an embodiment of the present disclosure, in a case that the rail vehicle operates under a traction condition or a coasting condition, the protection module is controlled to be turned off. In the case that the rail vehicle runs on the charged third rail, the protection module is controlled to be turned on, and the first current detected by the first current sensor is monitored. In the case that the rail vehicle operates under the traction condition, electrical energy in the third rail can be supplied to the traction motor via the protection module that is turned on. In the case that the rail vehicle operates under the coasting condition, the electrical energy in the third rail can also be supplied to the traction motor via the protection module that is turned on, to keep the traction motor charged. In the case that the first current is less than the first preset value, the protection module is controlled to be turned off and it is monitored whether the rail vehicle runs on a charged third rail, so as to prevent electrical energy in the support capacitor from being fed back to the uncharged third rail, thereby avoiding accidental damage to a worker. In the embodiment of the present disclosure, the protection module is controlled under the traction condition or the coasting condition, so that the electrical energy from the third rail can be utilized effectively. Further, the electrical energy in the support capacitor can be prevented from being fed back to an uncharged third rail, thereby avoiding accidents.

In a preferred embodiment, the rail vehicle running on a charged third rail includes a case that a voltage detected by a voltage sensor VH is greater than a second preset value. The protection module 3 being controlled to be turned off and whether the rail vehicle runs on a charged third rail being monitored in a case that the first current is less than a first preset value includes: the protection module 3 being controlled to be turned off and the voltage being monitored in the case that the first current is less than the first preset value.

In an embodiment of the present disclosure, the rail vehicle running on the charged third rail may be determined as the case that the voltage detected by the voltage sensor VH in FIG. 2 is greater than the second preset value. In this case, whether the rail vehicle runs on a charged third rail can be determined by using the voltage sensor VH in the conventional technology without an additional component, thereby reducing costs.

In addition to the above technical solutions, whether the rail vehicle runs on a charged third rail may also be determined in another manner. For example, a voltage detection device may be arranged on the third rail. A processor 1 may acquire a charged state of the third rail from the voltage detection device, so as to perform corresponding operations. Alternatively, a position at which the rail vehicle is currently located may be determined based on a starting position, a running speed and a running route of the rail vehicle. Then, whether the third rail is a charged third rail may be determined based on a pre-stored correspondence between a position of the rail vehicle and the charged state of the third rail. Whether the rail vehicle runs on a charged third rail may also be determined in other manners, which are not limited thereto.

Figure 3:
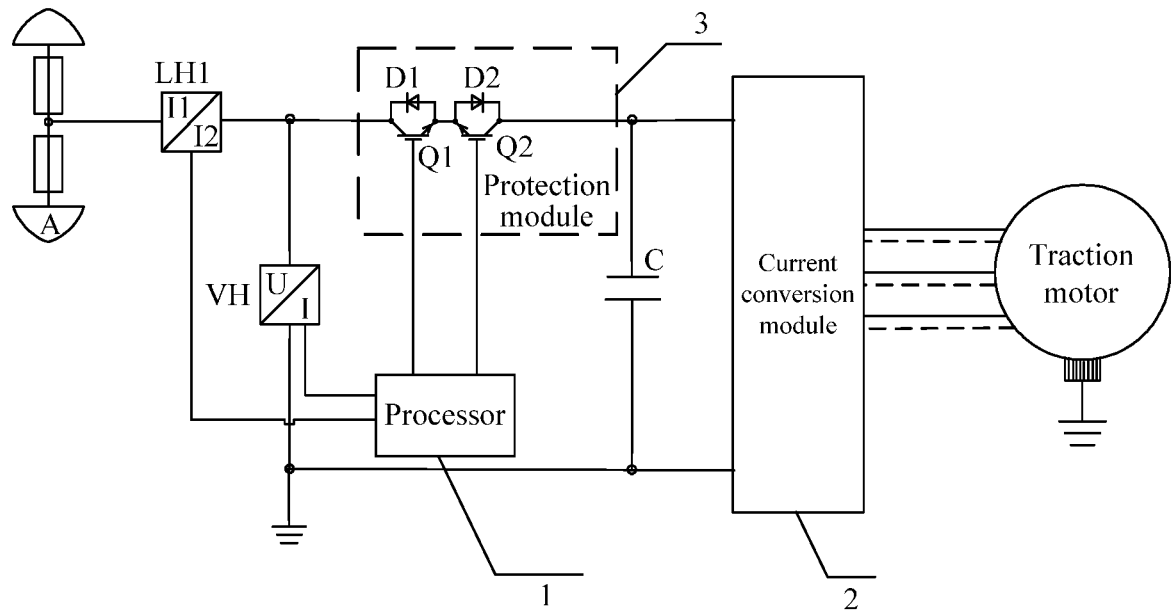
FIG. 3 is a schematic structural diagram of a main circuit of a traction system according to an embodiment of the present disclosure.

Reference is made to FIG. 3, which is a schematic structural diagram of a main circuit of a traction system according to the present disclosure. The main circuit of a traction system includes a current collector A, a first current sensor LH1, a voltage sensor VH, a protection module 3, a support capacitor C, a current conversion module 2 and a processor 1. The processor 1 is configured to execute a computer program to perform the method for controlling a main circuit of a traction system according to any one of the above embodiments.

The main circuit of a traction system may include two current collectors A, and two first current sensors LH1 accordingly. The two collectors A may be both connected to a power supply line. Each of the two collectors A is provided with a first current sensors LH1 at an input side of the current collector A, to detect a current of the current collector A. Therefore, a case that a rail vehicle runs in a rail gap or runs on a dead rail may be determined as a case that currents detected by the two first current sensors LH1 decrease to zero successively, thereby improving safety. Further, transmission effects of the current can be improved with the two current collectors A.

Alternatively, the main circuit of a traction system may include two current collectors A and one first current sensor LH1, which is not limited in the embodiment of the present disclosure.

In an embodiment of the present disclosure, a capacitor may be connected in series between a grounded side and a ground end, such that electromagnetic interference of the circuit can be reduced, and therefore electromagnetic interference received by components in the main circuit of a traction system is small.

The main circuit of a traction system according to the embodiment of the present disclosure may refer to the embodiments of the above method, and is not described in detail here.

Based on the above embodiments, in a preferred embodiment, the protection module 3 includes a first controllable switch Q1, a first unidirectional conductive component D1, a second controllable switch Q2 and a second unidirectional conductive component D2.

A first end of the first controllable switch Q1 is connected to a first end of the first unidirectional conductive component D1, as a first end of the protection module 3. A second end of the first controllable switch Q1 and a second end of the first unidirectional conductive component D1 are both connected to a first end of the second controllable switch Q2 and a first end of the second unidirectional conductive component D2. A second end of the second controllable switch Q2 is connected to a second end of the second unidirectional conductive component D2, as a second end of the protection module 3. A direction in which the first unidirectional conductive component D1 outputs a current is opposite to a direction in which the second unidirectional conductive component D2 outputs a current In the conventional technology, a charging contactor and a short-circuit contactor in the protection module 3 each have an electrical life of tens of thousands of times, and are turned on and off a large number of times every day, resulting in great reduction in a service life of the charging contactor and a service life of the short-circuit contactor. According to the embodiment of the present disclosure, a service life of the first controllable switch Q1 is not affected by the number of times that the first controllable switch Q1 is turned on and off, and a service life of the second controllable switch Q2 is not affected by the number of times that the second controllable switch Q2 is turned on and off. The first controllable switch Q1 and the second controllable switch Q2 according to the embodiment of the present disclosure each have a service life of numerous years, for example, ten years. Therefore, the protection module 3 according to the embodiment of the present disclosure has a long service life, thereby reducing costs. Further, it is unnecessary to repeatedly replace and maintain components in the protection module 3, thereby reducing labor costs.

Considering the application scenarios of the embodiments of the present disclosure, each of the first controllable switch Q1 and the second controllable switch Q2 may be implemented by a high-power controllable switch.

In a preferred embodiment, the main circuit of a traction system further includes a circuit breaker HB. A first end of the circuit breaker BB is connected to a second end of the first current sensor LH1. A second end of the circuit breaker BB is connected to the first end of the protection module 3 and a first end of the voltage sensor VH. The circuit breaker HB is configured to control the main circuit of a traction system to be turned on or turned off.

During operation of the rail vehicle, the main circuit of a traction system is required to be turned off in many cases. For example, if it is detected that the processor 1 cannot successfully control the first controllable switch Q1 and/or the second controllable switch Q2 to be turned on or off in a case that the rail vehicle runs operates in a traction condition, a coasting condition or a braking condition, the circuit breaker HB is controlled to be turned off to prevent, for example, the electrical energy from being fed back to a dead rail so as to avoid accidents, thereby increasing the safety of the main circuit of a traction system.

In addition to the above cases, the circuit breaker HB may also be controlled to be turned off in a case that a component, such as the current conversion module 2 or a motor, has a fault, so as to avoid accidents.

The circuit breaker HB may be a high-speed circuit breaker with a fast respond speed, thereby further improving safety of the main circuit of a traction system.

In addition to the above arrangement, the circuit breaker HB may also be arranged between the current collector A and the first current sensor LH1. One end of the circuit breaker BB is connected to the current collector A, and the other end of the circuit breaker BB is connected to the first current sensor LH1. Alternatively, the circuit breaker BB may be arranged between the voltage sensor VH and the protection module 3. The first end of the circuit breaker BB is connected to the first end of the voltage sensor VH, and the second end of the circuit breaker BB is connected to the first end of the protection module 3.

The processor 1 is further configured to control the circuit breaker BB to be turned off in a case that the first current detected by the first current sensor LH1 is greater than a third preset value.

The first current sensor LH1 may detect the first current supplied from the third rail to the traction motor. The case that the first current is greater than the third preset value indicates that a load of the traction motor is too high. In this case, the circuit breaker HB may be controlled to be turned off, so as to avoid damage to a related component and device.

In addition to the circuit breaker HB, the main circuit of a traction system may further include a three position switch. The three position switch is arranged between the first current sensor LH1 and the circuit breaker HB. The three position switch may be manipulated by a worker to operate in three gears, namely, a normal power-on mode, an overhaul mode and a turn-off and maintenance mode, which is convenient for the worker to control the circuit to be turned off when the circuit requires an overhaul and maintenance.

In a preferred embodiment, the main circuit of a traction system further includes an inductor L. A first end of the inductor L is connected to the second end of the protection module 3. A second end of the inductor L is connected to a first end of the support capacitor C and a first end of the current conversion module 2. The inductor L is configured to perform filtering together with the support capacitor C.

A filter formed by the inductor L and the support capacitor C may filter out a clutter in direct current electricity transmitted by the third rail, thereby enhancing anti-interference performance of the circuit.

A type of the inductor L is not limited in the embodiment of the present disclosure. For example, the inductor L may be a choking inductor L.

There are many types of the current sensor, which are not limited in the embodiments of the present disclosure.

In a preferred embodiment, the main circuit of a traction system further includes a second current sensor LH2. A first end of the second current sensor LH2 is connected to a second end of the voltage sensor VH, a second end of the current conversion module 2 and a second end of the support capacitor C. A second end of the second current sensor LH2 is grounded. An output end of the second current sensor LH2 is connected to the processor 1. The processor 1 is further configured to control the circuit breaker BB to be turned off in a case that a difference between a second current detected by the second current sensor LH2 and the first current is greater than a preset difference.

The second current sensor LH2 may detect the second current flowing through a negative output line at the ground end of the circuit. A case that the processor 1 determines that the difference between the first current and the second current is greater than the preset difference indicates that an electrical device between the first current sensor LH1 and the second current sensor LH2 may be short-circuited. In this case, the circuit breaker BB is controlled to be turned off, which is convenient for the worker to overhaul the circuit, thereby avoiding further damage.

A type of the second current sensor LH2 is not limited in the embodiments of the present disclosure.

The preset difference may be determined based on experience, which may be a difference between a current detected by the second current sensor LH1 and a current detected by a third current sensor LH2 under a normal condition.

In a preferred embodiment, at least one of the first controllable switch Q1 and the second controllable switch Q2 may be implemented by an IGBT (Insulated Gate Bipolar Transistor). In a case that the first controllable switch Q1 is implemented by the IGBT, a parasitic diode of the first controllable switch Q1 serves as the first unidirectional conductive component D1. In a case that the second controllable switch Q2 is implemented by the IGBT, a parasitic diode of the second controllable switch Q2 serves as the second unidirectional conductive component D2.

The IGBT has advantages of high withstand voltage, low conduction voltage, fast switching speed and long service life.

In addition to the IGBT, at least one of the first controllable switch Q1 and the second controllable switch Q2 may also be implemented by other types of controllable switch, such as a GTO (Gate Turn-Off Thyristor), a GTR (Giant Transistor), a MOSFET (Metal-Oxide-Semiconductor Field-Effect Transistor), a power field-effect transistor POWER MOSFET, an IGCT (integrated Gate Commutated Transistor), an MCT (MOS Controlled Thyristor), and a Static Induction Thyristor SITH, which are not limited in the embodiments of the present disclosure.

Figure 4:
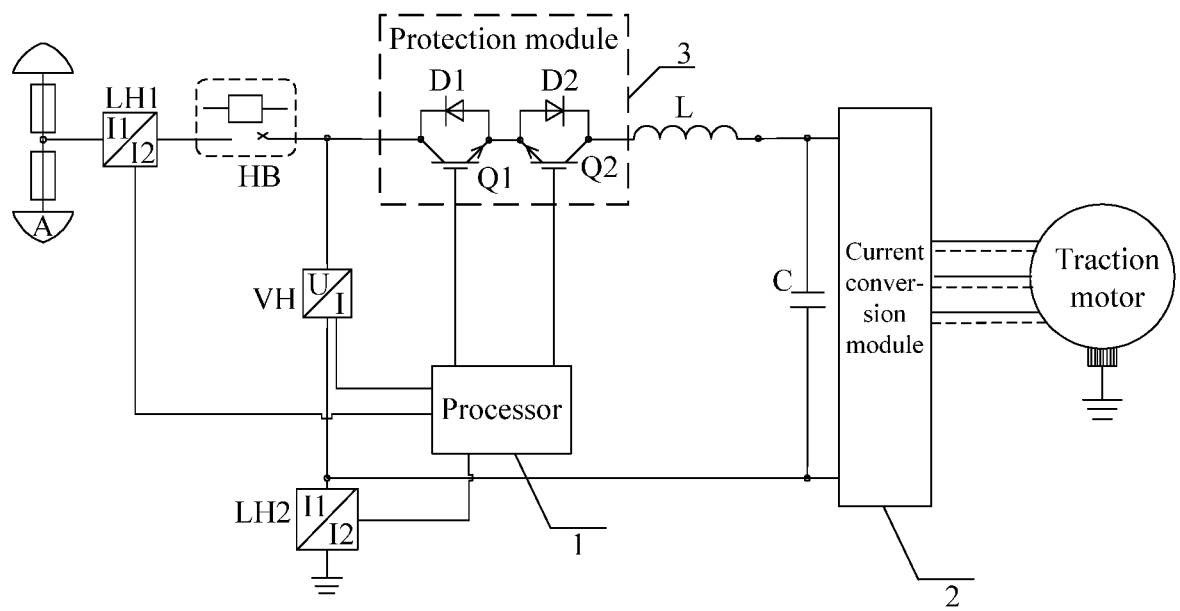
FIG. 4 is a schematic structural diagram of a main circuit of a traction system according to another embodiment of the present disclosure.

In order to illustrate the embodiments of the present disclosure better, reference is made to FIG. 4, which is a schematic structural diagram of a main circuit of a traction system according to another embodiment of the present disclosure. The main circuit of a traction system includes a current collector A, a first current sensor LH1, a circuit breaker HB, a second current sensor LH2, a third current sensor LH3, a first controllable switch Q1, a second controllable switch Q2, a first unidirectional conductive component D1, a second unidirectional conductive component D2, an inductor L, a support capacitor C, a current conversion module 2, a voltage sensor VH and a processor 1.

In a case that the rail vehicle operates under the traction condition, the processor 1 may, in response to a traction command, control the first controllable switch Q1 to be turned on and the second controllable switch Q2 to be turned off. Direct current electricity in the third rail may be converted into direct current electricity by the current conversion module 2, so as to supply power to the traction motor. The current conversion module 2 may be a traction converter, which inverts high-voltage direct current electricity into alternating current electricity with an adjustable voltage and an adjustable frequency, so as to supply power to the traction motor.

Under the traction condition, in a case that the rail vehicle runs in a rail gap or runs on a dead rail, the first current detected by the first current sensor LH1 decreases to zero because the rail vehicle runs away from the third rail with high-voltage. The processor 1 controls the first controllable switch Q1 and the second controllable switch Q2 to be turned off immediately when determining that the first current detected by the first current sensor LH1 is less than the first preset value (which is a threshold set by the traction system in advance), that is, when determining that the rail vehicle runs in a rail gap or runs on a dead rail, so as to prevent high-voltage electricity of the support capacitor C from being fed back to the dead rail. In addition, it may be determined whether to turn off the current conversion module 2 based on actual requirements of user.

In a case that the rail vehicle operates under a coasting condition and the rail vehicle does not turn off the current conversion module 2, the processor 1 may control the first controllable switch Q1 to be turned on and the second controllable switch Q2 to be turned off. The high-voltage direct current electricity in the third rail is supplied to the traction motor via the current collector A and the current conversion module 2. In a case that the rail vehicle runs in a rail gap or runs on a dead rail, the first current detected by the first current sensor LH1 is equal to zero because the rail vehicle runs away from the third rail with high-voltage. The processor 1 controls the first controllable switch Q1 and the second controllable switch Q2 to be turned off immediately when determining that the first current detected by the first current sensor LH1 is less than the first preset value, that is, when determining that the rail vehicle runs in a rail gap or runs on a dead rail, so as to prevent high-voltage electricity of the support capacitor C from being fed back to the dead rail. In addition, it may be determined whether to turn off the current conversion module 2 based on actual requirements of user.

In a case that the rail vehicle operates under the coasting condition and the rail vehicle turns off the current conversion module 2, the processor 1 may control the first controllable switch Q1 and the second controllable switch Q2 both to be turned off, so as to prevent the high-voltage electricity of the support capacitor C from being fed back to the dead rail.

When switching to the braking condition, the rail vehicle first performs regenerative braking to convert mechanical energy of the traction motor into electrical energy. The electrical energy is rectified by the current conversion module 2 into direct current electricity, and then is fed back to the third rail via the inductor L. Whether the rail vehicle runs in a rail gap or runs on a dead rail may also be determined by monitoring the first current detected by the first current sensor LH1. However, different from the traction condition, whether the rail vehicle runs in a rail gap or runs on a dead rail may be determined the same as that under the traction condition in a case that the third rail is capable of collecting electrical energy. Whether the rail vehicle runs in a rail gap or runs on a dead rail may be erroneously determined in a case that the third rail is incapable of collecting electrical energy. As a result, the rail vehicle cannot feed the electrical energy generated from regenerative braking back to the third rail after the third rail is capable of collecting electrical energy. Therefore, the main circuit of a traction system under the braking condition is controlled as follows.

When the rail vehicle switches to the braking condition, a control system of the traction system immediately controls the first controllable switch Q1 to be turned off. Then, it is determined whether the voltage sensor VH detects a line voltage. In a case that the voltage sensor VH detects the line voltage, the second controllable switch Q2 is turned on, and the electrical energy generated from regenerative braking is fed back to the third rail via the second controllable switch Q2 and a diode connected in paralleled with the first controllable switch Q1. In a case that the rail vehicle runs in a rail gap or runs on a dead rail, or the charged third rail is incapable of collecting electrical energy, the first current detected by the first current sensor LH1 decreases to zero. The processor 1 controls the second controllable switch Q2 to be turned off immediately when determining that the first current detected by the first current sensor LH1 is less than the first preset value, that is, when determining that the rail vehicle runs in a rail gap or runs on a dead rail or the charged third rail is incapable of collecting electrical energy. Then, the processor 1 monitors whether the voltage detected by the voltage sensor VH is greater than a second preset value. In a case that the voltage detected by the voltage sensor VH is greater than the second preset value, the second controllable switch Q2 is controlled to be turned on at a fixed frequency. In addition, the first current detected by the first current sensor LH1 is monitored, and the above operations are repeated.

Accordingly, in a case that the rail vehicle runs on an uncharged third rail and is required to switch to the traction condition, the processor 1 may control the first controllable switch Q1 to be turned on and the second controllable switch Q2 to be turned off when determining that the voltage detected by the voltage sensor VH is greater than the second preset value. The rail vehicle switches to the traction condition.

The first controllable switch Q1 and the second controllable switch Q2 may be integrated into the current conversion module 2. In this way, a charging contactor, a charging resistor and a short-circuit contactor in the conventional technology may be omitted, so as to save space of a cabinet. In addition, the processor 1 may be integrated into the current conversion module 2, so as to further save space for wiring, which is of great significance for weight reduction and structure optimization.

Figure 5:
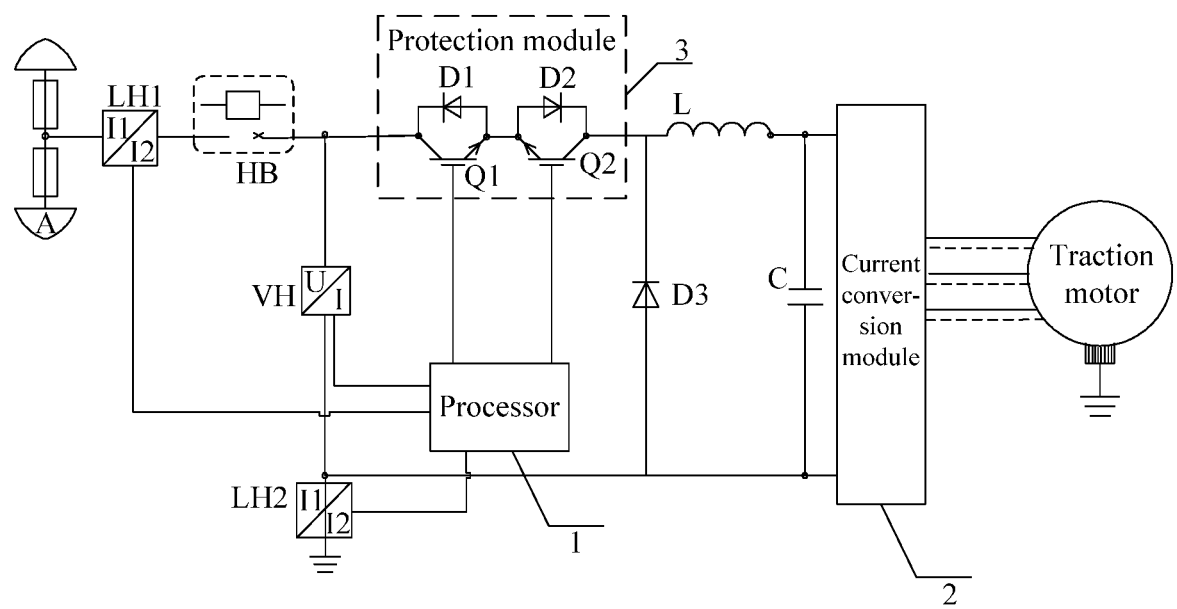
FIG. 5 is a schematic structural diagram of a main circuit of a traction system according to another embodiment of the present disclosure.

Reference is made to FIG. 5, which is a schematic structural diagram of a main circuit of a traction system according to another embodiment of the present disclosure. Based on the technical solutions shown in FIG. 4, the main circuit of a traction system shown in FIG. 5 further includes a diode D3. A cathode of the diode D3 is connected to the second end of the protection module 3 and the first end of the inductor L. An anode of the diode D3 is connected to the first end of the second current sensor LH2, the second end of the support capacitor C and the second end of the current conversion module 2. When the support capacitor C is initially charged before operation of the rail vehicle, the support capacitor C may be charged, in coordination with a free-wheeling circuit formed by the inductor L, the support capacitor C and the diode D3, by controlling the first controllable switch Q1 to be turned on or off.

There may be many types of the diode D3, such as a fast recovery diode or a Schottky diode, which is not limited herein.

A rail vehicle is further provided according to the present disclosure. The rail vehicle includes the main circuit of a traction system according to any one of the above embodiments.

For description of the rail vehicle according to the present disclosure, reference may be made to the embodiments of the main circuit of a traction system. The rail vehicle is not described in detail herein.

The embodiments in this specification are described in a progressive way, each of which emphasizes the differences from others, and the same or similar parts among the embodiments can be referred to each other. Since the device disclosed in the embodiments corresponds to the method therein, the description thereof is relatively simple, and for relevant matters references may be made to the description of the method.

It should be further noted that the relationship terminologies such as "first", "second" in the present disclosure are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including multiple components includes not only the components but also other components that are not enumerated, or also include the components inherent for the process, method, article or device. Unless expressively limited otherwise, the statement "comprising (including) one . . . " does not exclude the case that other similar components may exist in the process, method, article or device.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A method for controlling a main circuit of a traction system, comprising:
under a braking condition,
controlling a protection module to be turned off, wherein the protection module comprises a first controllable switch and a second controllable switch that are connected in series with opposite polarities, and the first controllable switch and the second controllable switch are integrated into a current conversion module of the main circuit of the traction system;
controlling the protection module to be turned on and monitoring a first current detected by a first current sensor in a case that a rail vehicle runs on a charged third rail; and
controlling the protection module to be turned off and monitoring whether the rail vehicle runs on a charged third rail in a case that the first current is less than a first preset value.

2. The method according to claim 1, further comprising:
under a traction condition or a coasting condition,
controlling the protection module to be turned off;
controlling the protection module to be turned on and monitoring a first current detected by the first current sensor, in a case that the rail vehicle runs on a charged third rail; and
controlling the protection module to be turned off and monitoring whether the rail vehicle runs on a charged third rail in a case that the first current is less than the first preset value.

3. The method according to claim 1, wherein
the fact that the rail vehicle runs on a charged third rail is determined by a voltage sensor detecting a voltage greater than a second preset value.

4. A main circuit of a traction system, comprising:
a current collector;
a first current sensor;
a voltage sensor;
a protection module;
a support capacitor;
a current conversion module; and
a processor,
wherein the processor is configured to execute a computer program to perform the method for controlling a main circuit of a traction system according to claim 1.

5. The main circuit of a traction system according to claim 4, wherein the protection module comprises a first controllable switch, a first unidirectional conductive component, a second controllable switch and a second unidirectional conductive component, wherein
a first end of the first controllable switch is connected to a first end of the first unidirectional conductive component, as a first end of the protection module;
a second end of the first controllable switch and a second end of the first unidirectional conductive component are both connected to a first end of the second controllable switch and a first end of the second unidirectional conductive component; and
a second end of the second controllable switch is connected to a second end of the second unidirectional conductive component, as a second end of the protection module, wherein
a direction in which the first unidirectional conductive component outputs a current is opposite to a direction in which the second unidirectional conductive component outputs a current.

6. The main circuit of a traction system according to claim 5, further comprising a circuit breaker configured to control the main circuit of a traction system to be turned on or turned off, wherein
a first end of the circuit breaker is connected to a second end of the first current sensor; and
a second end of the circuit breaker is connected to the first end of the protection module and a first end of the voltage sensor.

7. The main circuit of a traction system according to claim 6, further comprising an inductor configured to perform filtering together with the support capacitor, wherein
a first end of the inductor is connected to the second end of the protection module; and
a second end of the inductor is connected to a first end of the support capacitor and a first end of the current conversion module.

8. The main circuit of a traction system according to claim 7, further comprising a second current sensor, wherein
a first end of the second current sensor is connected to a second end of the voltage sensor, a second end of the current conversion module and a second end of the support capacitor;
a second end of the second current sensor is grounded; and
an output end of the second current sensor is connected to the processor, wherein
the processor is further configured to control the circuit breaker to be turned off in a case that a difference between a second current detected by the second current sensor and the first current is greater than a preset difference.

9. The main circuit of a traction system according to claim 5, wherein
at least one of the first controllable switch and the second controllable switch is implemented by an insulated gate bipolar transistor IGBT, wherein
in a case that the first controllable switch is implemented by the IGBT, a parasitic diode of the first controllable switch serves as the first unidirectional conductive component; and
in a case that the second controllable switch is implemented by the IGBT, a parasitic diode of the second controllable switch serves as the second unidirectional conductive component.

10. A rail vehicle, comprising the main circuit of a traction system according to claim 4.

* * * * *